US008850992B1

(12) United States Patent
Akpaffiong

(10) Patent No.: US 8,850,992 B1
(45) Date of Patent: Oct. 7, 2014

(54) PORTABLE ARTICULATED SUPPORT FRAME FOR SUPPORTING OBJECTS ON A USER'S LAP

(71) Applicant: Itoro Akpaffiong, Houston, TX (US)

(72) Inventor: Itoro Akpaffiong, Houston, TX (US)

(*) Notice: Subject to any disclaimer, the term of this patent is extended or adjusted under 35 U.S.C. 154(b) by 0 days.

(21) Appl. No.: 14/101,317

(22) Filed: Dec. 9, 2013

Related U.S. Application Data

(60) Provisional application No. 61/826,099, filed on May 22, 2013.

(51) Int. Cl.
A47B 37/00 (2006.01)
F16M 13/04 (2006.01)

(52) U.S. Cl.
CPC ................... F16M 13/04 (2013.01)
USPC ........................................ 108/43

(58) Field of Classification Search
USPC ................. 248/150, 166, 188.6, 444, 346.01, 248/346.07; 16/254, 270, 261, 262, 263, 16/386; 108/42, 43, 115
See application file for complete search history.

(56) References Cited

U.S. PATENT DOCUMENTS

| 696,044 | A | * | 3/1902 | Hoffman | 108/43 |
| 1,035,290 | A | * | 8/1912 | Wood | 248/444 |
| 1,682,180 | A | | 8/1928 | Merrill | |
| 1,743,406 | A | * | 1/1930 | Stone | 108/44 |
| 1,830,085 | A | * | 11/1931 | Bodenstein, Jr. et al. | 224/42.37 |
| 2,252,737 | A | * | 8/1941 | Siess | 16/261 |
| 2,292,356 | A | | 8/1942 | Belanger | |
| 2,575,188 | A | * | 11/1951 | Schell | 99/449 |
| 2,647,381 | A | * | 8/1953 | Lamounette | 248/167 |
| 3,118,369 | A | * | 1/1964 | Antonucci | 101/93.28 |
| 4,088,351 | A | | 5/1978 | Roth | |
| 4,598,889 | A | * | 7/1986 | Remington | 244/87 |
| 4,725,028 | A | * | 2/1988 | Conradt | 248/150 |
| 4,822,066 | A | * | 4/1989 | Rehrig | 280/79.11 |
| 4,852,324 | A | * | 8/1989 | Page | 52/506.02 |
| 4,982,925 | A | * | 1/1991 | Hinderliter | 248/455 |
| 5,040,760 | A | | 8/1991 | Singer | |
| 5,098,053 | A | | 3/1992 | Cotterill | |
| 5,331,764 | A | * | 7/1994 | Sun | 47/45 |
| 5,362,025 | A | | 11/1994 | Trom et al. | |
| 5,713,548 | A | | 2/1998 | Boyer et al. | |
| 5,979,016 | A | * | 11/1999 | Fan | 16/267 |
| 6,305,652 | B1 | | 10/2001 | Broke et al. | |
| 6,354,658 | B1 | | 3/2002 | Sher et al. | |
| 6,450,469 | B1 | * | 9/2002 | Okuno | 248/346.01 |
| 7,469,485 | B1 | * | 12/2008 | Perdue | 33/562 |
| 8,534,619 | B2 | * | 9/2013 | Huang et al. | 248/166 |
| 2002/0190180 | A1 | | 12/2002 | Cotterill | |
| 2008/0006749 | A1 | * | 1/2008 | Ferritto | 248/188.6 |

* cited by examiner

Primary Examiner — Janet M Wilkens
(74) Attorney, Agent, or Firm — Kenneth A. Roddy

(57) ABSTRACT

A portable articulated support device has an articulated quadrilateral frame having four straight sides formed of elongate thin rectangular panels pivotally connected at opposed ends with opposed sides disposed in parallel spaced relation. The frame can be expanded and collapsed between a generally rectangular configuration and a generally diamond-shaped rhombus configuration to be supported in a generally horizontal plane upon the lap of a seated user for supporting various objects on the lap of the seated user. A first pair and a second pair of the panels each are pivotally connected together at a first end, and the first pair and second pair of panels are pivotally and detachably connected together at a second end. The first pair of panels can be detached from the second pair of panels and each pair can be pivoted about their first end to assume an overlapped parallel superposed relation for compact storage.

3 Claims, 4 Drawing Sheets

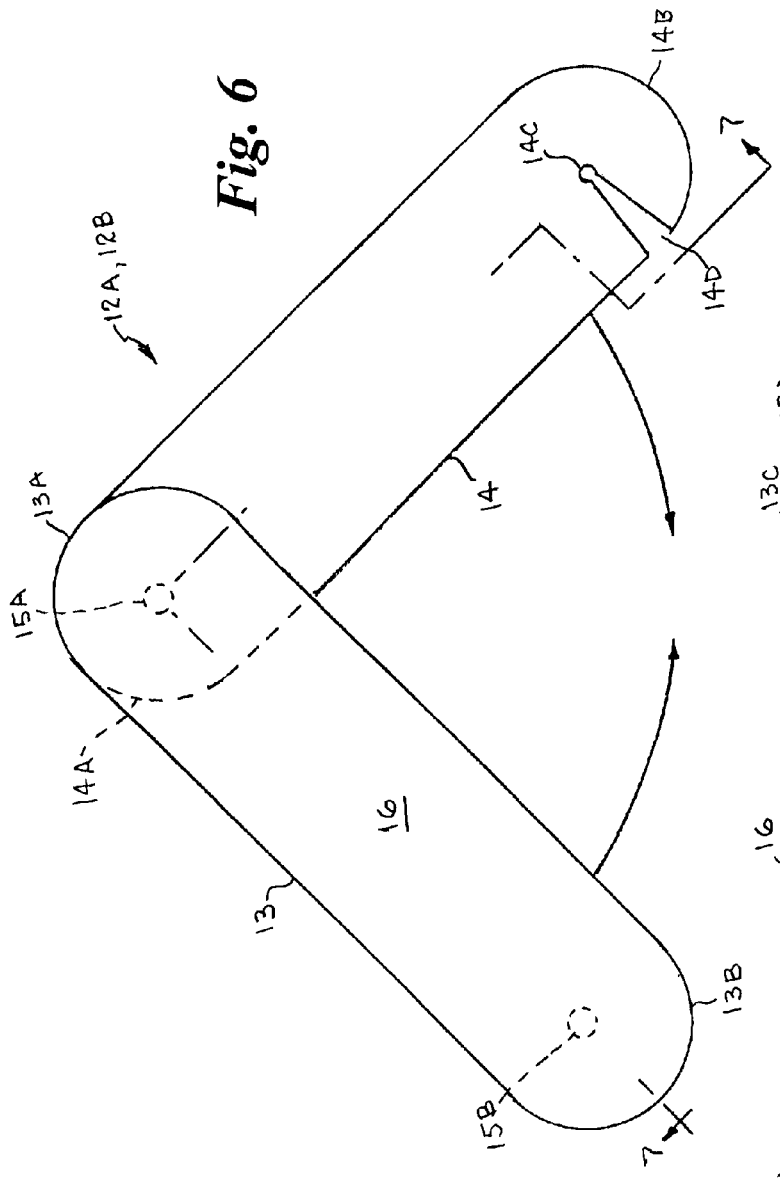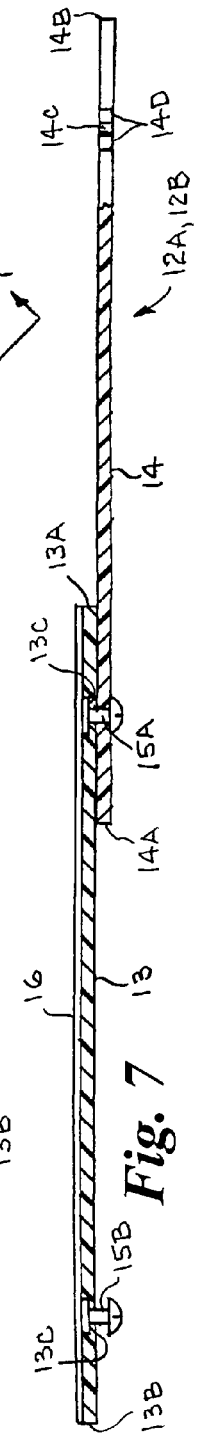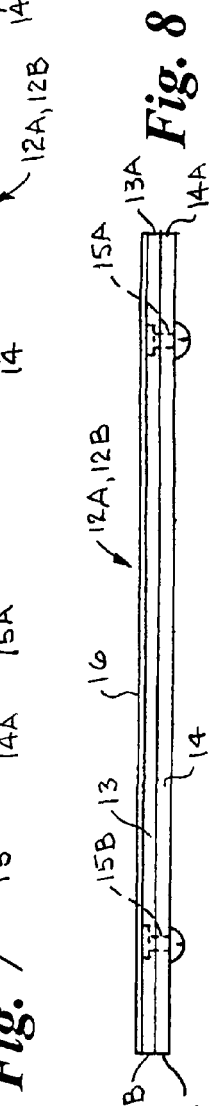

PORTABLE ARTICULATED SUPPORT FRAME FOR SUPPORTING OBJECTS ON A USER'S LAP

CROSS REFERENCE TO RELATED APPLICATION

This application claims priority of U.S. Provisional Application Ser. No. 61/826,099, filed May 22, 2012.

BACKGROUND OF THE INVENTION

1. Field of the Invention

This invention relates generally to portable lap desks and supports for supporting objects upon the lap of a seated individual and, more particularly, to a portable articulated support device having an articulated quadrilateral frame that can be expanded and collapsed between a generally rectangular configuration and a generally diamond-shaped rhombus configuration to be supported in a generally horizontal plane upon the lap of a seated user for supporting various objects on the lap of the seated user

2. Background Art

A common problem with desk top computers is that the desk surface available is typically not large enough to comfortably accommodate the computer, the monitor, the keyboard, and the mouse. This is particularly true when the computer is supported on a credenza or other narrow piece of furniture, or the desk surface is also occupied with books, papers and other work materials. Many solutions have been proposed for this problem. Some desks have a shallow drawer in which the keyboard is stored and pulled out for use. Freestanding drawer units are commercially available which are placed on top of the desk under the computer.

Laptop or notebook computers are typically used on airplanes, in airports, at all types of meetings, and in a wide variety of public places, including libraries, restaurants, parks, etc. With such a wide array of circumstances of use, and the attendant variety of public and private seating, there are a number of physical conditions and positions in which the user may find himself or herself uncomfortable when attempting to use a laptop computer.

As a result, many people attempt to balance the keyboard or the laptop computer with keyboard on their lap during use. Not all of these conditions present the optimal situation for comfortable, ergonomically correct use of the keyboard or the laptop computer with keyboard. For example, it is difficult to balance and maintain the lap-supported keyboard or laptop computer with keyboard at a comfortable height and a substantially horizontal angle relative to the wrists and hands of the user.

There are also occasions when it would be desirable to support other objects on the lap, such for example, but not limited to, books, computer peripheral devices, cell phones, portable electronic audio and video players, and portable electronic game devices, rather than holding them in the hand.

It would also be desirable to have a portable support device for supporting various objects on the lap of a seated user that could be selectively changed in shape and size to fit the size of the user, the space in which the user is seated, and to support a wide variety of objects of different shapes and sizes. It would also be desirable to have a portable support device for supporting various objects on the lap of a seated user that could be easily and quickly disassembled and folded into a small compact configuration for compact storage and transportation.

There are a number of commercially available portable lap desks and supports for supporting objects upon the lap of a seated individual, most of which are generally square or rectangular and cannot be selectively changed in shape and size. There are also several patents directed toward keyboard support frames and portable hinged or pivoting lap desks and supports of various constructions for supporting laptops, keyboards, a mouse, etc., on the lap of a seated individual. The following are some examples.

Singer, U.S. Pat. No. 5,040,760, discloses a support for a keyboard of a computer resting on spaced apart feet on a narrow support surface that includes two articulated elongated members laterally spaced apart between the feet on the computer by cross-braces. The first end sections of the elongated members are placed on the support surface under the spaced apart feet of the computer to cantilever the middle sections and second end sections out over the edge of the support surface with the middle sections extending generally downward adjacent the edge of the support surface and the second end sections extending generally laterally outward from the middle sections to form spaced apart supports for the keyboard. Preferably, the middle sections of the elongated members are hinged to the end sections for adjusting the height at which the keyboard is supported and to rotate the middle sections to a generally horizontal position with the second end sections extending generally upward to form a cradle for stowing the keyboard when not in use with the keys facing the computer. Also preferably, the second end sections are hinged to the middle sections such that through adjustment of the two sets of hinges the keyboard can be set to a range of heights.

Cotterill, U.S. Pat. No. 5,098,053, discloses a selectively controlled keyboard support that has a mounting bracket, a keyboard support bracket pivotally connected via parallel bars permitting change in altitude of the support bracket. The mechanism may be locked against change in altitude by means of a formation associated with a bar which is interengageable with a formation associated with the support bracket by means of a laterally operable lever resiliently biased by a spring plate towards engagement. In a preferred embodiment the support bracket may be tilted about a pivot and the mechanism permits one-handed selective operation of altitude adjustment or tilt adjustment.

Trom et al, U.S. Pat. No. 5,362,025, discloses a portable computer support device for supporting portable personal computers atop tripods, pedestals, legs, stands, and similar devices. The support device comprises a base having a threaded annular aperture fastener and a plurality of support arms to universally fit the mounting apparatus on photographic or camcorder tripods, pedestals or similar stands. In the preferred embodiment, the end of each adjustable extensible support arm is pronged and plastic dipped to secure the corners of the computer to the base. An interlocking, mechanical fabric fastener is used to secure the computer to the support by strapping across the top of the computer and attaching to each of the rear support arms below the computer.

Boyer et al, U.S. Pat. No. 5,713,548, discloses a system for retaining a computer or other article on the human body, such as on the lap or other appropriate anchor point to prevent it from slipping or dropping. The system includes an encircling strap and coacting strips of hook-and-loop fastener material that are secured around a limb or limbs or other appropriate anchor point while also holding the device. A first variation enables the user to secure one or more articles such as a laptop computer on the lap using a non-elastic strap which encircles both legs at the thighs. A second variation enables the user to secure a smaller device such as a palmtop computer or cellular telephone to a single thigh or to an arm. Another form of the strap device has a strip of non-slip material on its top surface to simply retain a hand-manipulable device by friction.

Borke et al, U.S. Pat. No. 6,305,652, discloses a laptop computer support which includes a first panel, a second panel, and a third panel. The first panel includes a free edge and a hinged edge opposite the free edge. This hinged edge is hingedly connected to a first hinged edge of the second panel. The second panel further includes a second hinged edge opposite the first hinged edge. This second hinged edge is itself hingedly connected to a hinged edge on the third panel, with the third-panel hinged edge being positioned opposite a third-panel free edge. A first fastener member on the first panel and a second fastener member on the third panel may be releasably and adjustably fastened together to provide multiple support surfaces and support-surface angles for a laptop computer or other item.

Sher et al, U.S. Pat. No. 6,354,658, discloses a chair arm-mounted tray apparatus that can be mounted on chair arms of a chair having a chair seat, for supporting an item. The apparatus includes an item support deck for supporting an item; and a deck support frame fastened to the support deck, the deck support frame having a chair arm engaging mechanism for removably securing the apparatus to the arms of a chair; so that the deck support frame positions the deck forwardly of the chair at an adjustable height and at an adjustable orientation relative to horizontal. The deck support frame preferably includes two parallel and laterally spaced apart telescoping frame arms removably secured to the chair arms by the chair arm engaging mechanism, the frame arms each having a frame arm forward end adjacent to the deck and a frame arm rearward end adjacent to the chair. The deck support frame alternatively includes at least one telescoping frame arm removably secured to a chair arm by the chair arm engaging mechanism, the frame arm having a frame arm forward end adjacent to the deck and a frame arm rearward end adjacent to the chair.

Coterill, U.S. Published Application 2002/0190180, discloses a linkage mechanism for adjustably mounting a movable support to a fixed member, such as a keyboard support platform to a desk, for movement between a first position and a second position. The mechanism includes a first linkage arm respectively connected at each end to the fixed member and the movable support and second linkage arm having one end connected to the movable support and the other to a connector located intermediate the ends of the first linkage arm. A third linkage arm extends between the movable support and the connector. The connector controls the movable support during the movement between the first and second positions. A two link arrangement is also disclosed having a pair of linkage arms extending between a movable support and a fixed member. The linkage arms being linked by a connector intermediate their respective ends.

In addition, a variety of other hinged or pivoting frame devices are known, that can be expanded and collapsed, but are but are not configured to be supported on the lap of a seated individual or supporting objects on the lap, such as: Merrill, U.S. Pat. No. 1,682,180; Belanger, U.S. Pat. No. 2,292,356; and Roth, U.S. Pat. No. 4,088,351.

SUMMARY OF THE INVENTION

The present invention overcomes the aforementioned problems, and is distinguished over the prior art in general, and these patents in particular. by a portable articulated support device having an articulated quadrilateral frame with four straight sides pivotally connected at four corners with opposed sides disposed in parallel spaced relation, the sides formed of elongate thin rectangular panels. The frame can be expanded and collapsed between a generally rectangular configuration and a generally diamond-shaped rhombus configuration to be supported in a generally horizontal plane upon the lap of a seated user for supporting various objects on the lap of the seated user. A first pair and a second pair of the panels each are pivotally connected together at a first end, and the first pair and second pair of panels are pivotally and detachably connected together at a second end. The first pair of panels can be detached from the second pair of panels and each pair can be pivoted about their first end to assume an overlapped parallel superposed relation for compact storage.

One of the significant features and advantages of the present portable support device for supporting various objects on the lap of a seated user is that it can be easily and quickly selectively changed in shape and size to fit the size of the user, the space in which the user is seated, and to support a wide variety of objects of different shapes and sizes.

Another significant feature and advantage of the present invention is that it can be easily and quickly assembled and disassembled, and can disassembled and folded into a small compact configuration for compact storage and transportation.

Another significant feature and advantage of the present invention is that it can be easily and quickly assembled and used on airplanes, in airports, at meetings, and in a wide variety of public places, including libraries, restaurants, parks, etc.

Another significant feature and advantage of the present invention is that it allows the user to support a keyboard or a laptop computer with keyboard, on their lap during use at a comfortable ergonomically proper height and a substantially horizontal angle relative to the wrists and hands of the user.

A further feature and advantage of the present invention is that it also allows the user to support a variety of other objects on their lap, such as for example, but not limited to, books, computer peripheral devices, cell phones, portable electronic audio and video players, and portable electronic game devices, rather than holding them in the hand.

A still further features and advantages of the present invention is that it is simple in construction, inexpensive to manufacture, and rugged and reliable in operation.

Other features and advantages of the invention will become apparent from time to time throughout the specification and claims as hereinafter related.

BRIEF DESCRIPTION OF THE DRAWINGS

FIG. 6 is a top plan view of one set of panels of the articulated parallelogram frame, shown in an assembled condition with the panels being pivoted angularly inward toward each other.

FIG. 7 is a longitudinal cross sectional view of a set of panels taken along line 7-7 of FIG. 6 with an end portion of one panel shown in elevation to more clearly show the wedge-shaped slot.

FIG. 8 is a side view of one set of panels of the articulated parallelogram frame, shown in the assembled condition and pivoted to assume a superposed relation for compact storage.

DESCRIPTION OF THE PREFERRED EMBODIMENT

As used herein, the following terms have the following meanings. A "polygon" is a closed plane figure bounded by three or more straight sides that meet in pairs in the same number of vertices or corners, and do not intersect other than at these vertices. A "quadrilateral" is a polygon with four sides (or edges) and four vertices or corners. A "parallelogram" is a four-sided plane figure (quadrilateral) with opposite sides parallel. Parallelograms include: the "square" (having four sides of equal length), the "rectangle" (having four right angles), the "rhombus" (having oblique angles) and the "rhomboid" (having adjacent sides of unequal length).

Figure 1:
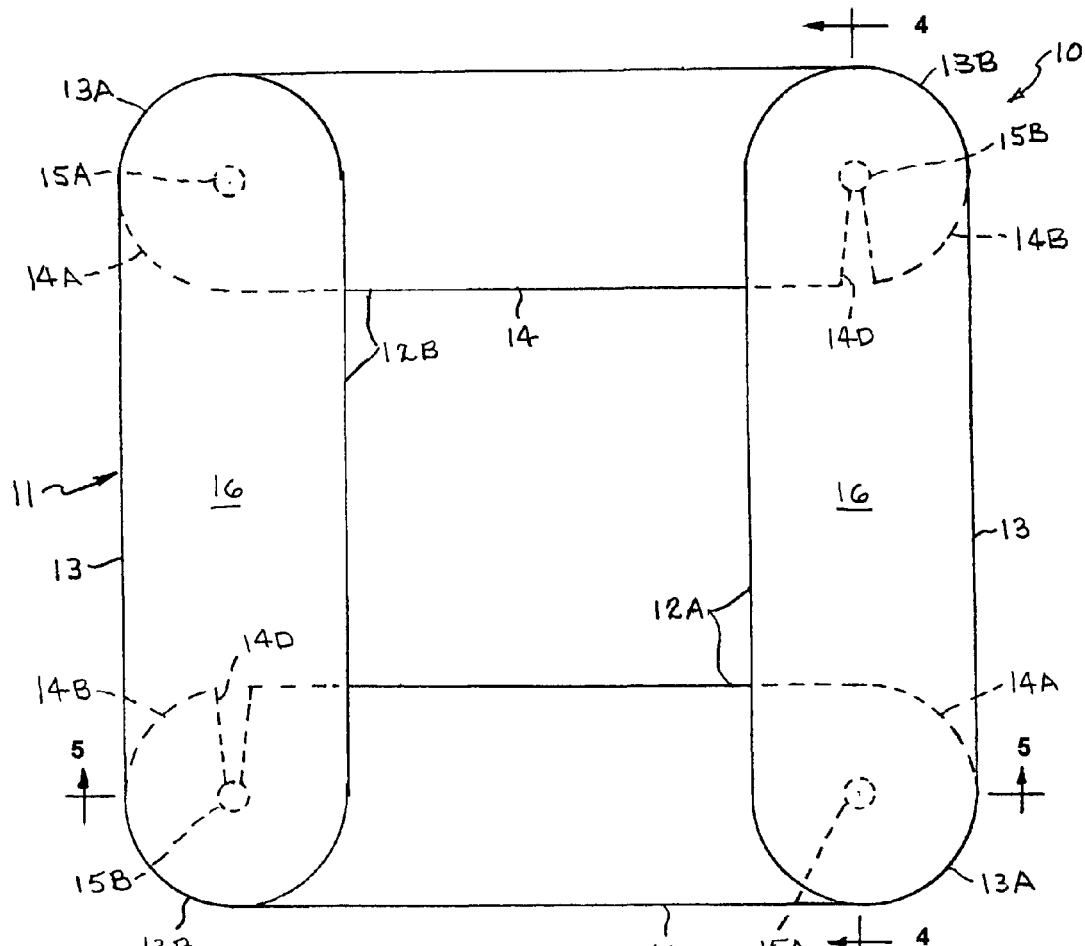
FIG. 1 and FIG. 2 are top plan views of the portable articulated support device in accordance with the present invention in an assembled condition, shown with the articulated frame in an expanded generally rectangular configuration, and in a collapsed generally diamond-shaped rhombus configuration, respectively.
Figure 4:
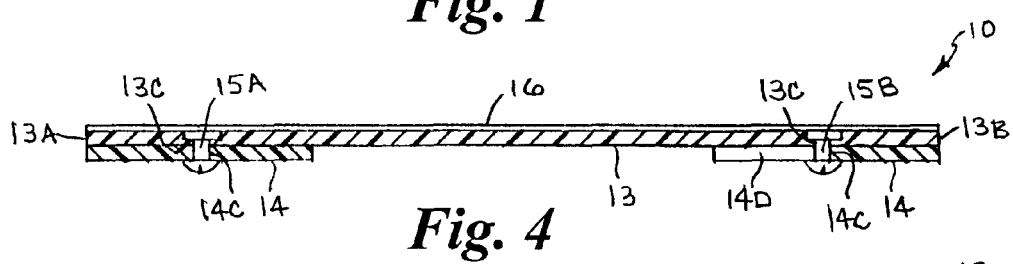
FIG. 4 is a longitudinal cross sectional view of the assembled frame taken along line 4-4 of FIG. 1.
Figure 5:
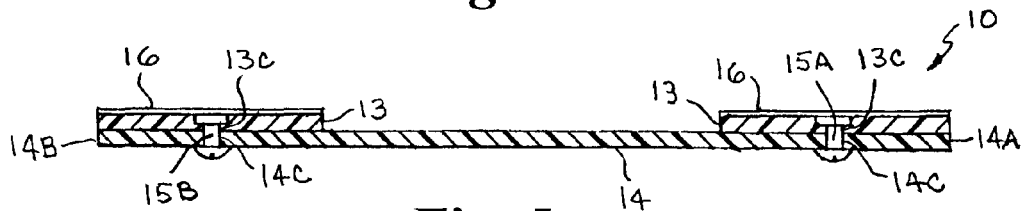
FIG. 5 is a longitudinal cross sectional view of the assembled frame taken along line 5-5 of FIG. 1.
Figure 2:
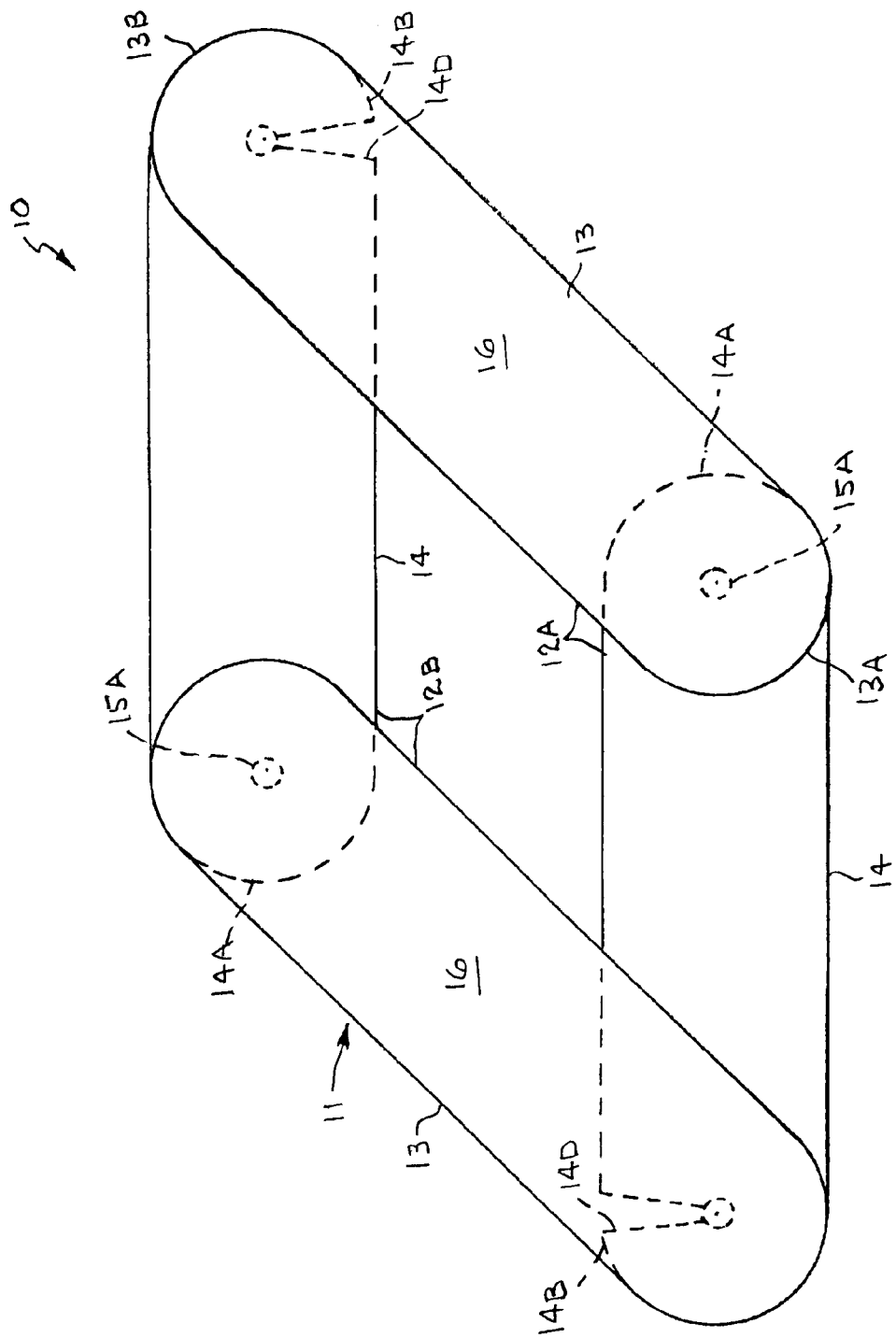

Referring now to the drawings by numerals of reference, there is shown in FIGS. 1 and 2, a portable articulated support device 10 in accordance with the present invention. The portable articulated support device 10 has an articulated quadrilateral frame 11 with four straight sides formed of elongate thin rectangular panels pivotally connected adjacent to their outer ends with opposed sides disposed in parallel spaced relation.

In the illustrated examples, the quadrilateral frame 11 is of a parallelogram configuration and the opposed straight sides are of equal length. However, it should be understood that the quadrilateral frame 11 may be a rectangular configuration having four right angles with opposed straight sides of unequal length, a rhombus configuration having oblique angles, or a rhomboid configuration having adjacent sides of unequal length.

The frame 11 is formed of a first pair 12A and a second pair 12B of top and bottom panels 13 and 14 of identical construction which are pivotally connected together at a first end and pivotally and detachably connected together at a second end, respectively, as described in detail hereinafter. When the panels are connected, the frame 11 can be expanded and collapsed between a generally rectangular configuration (FIG. 1) and a generally diamond-shaped rhombus configuration (FIG. 2) to be supported in a generally horizontal plane upon the lap of a seated user (not shown) for supporting various objects on the lap of the seated user.

Figure 3:
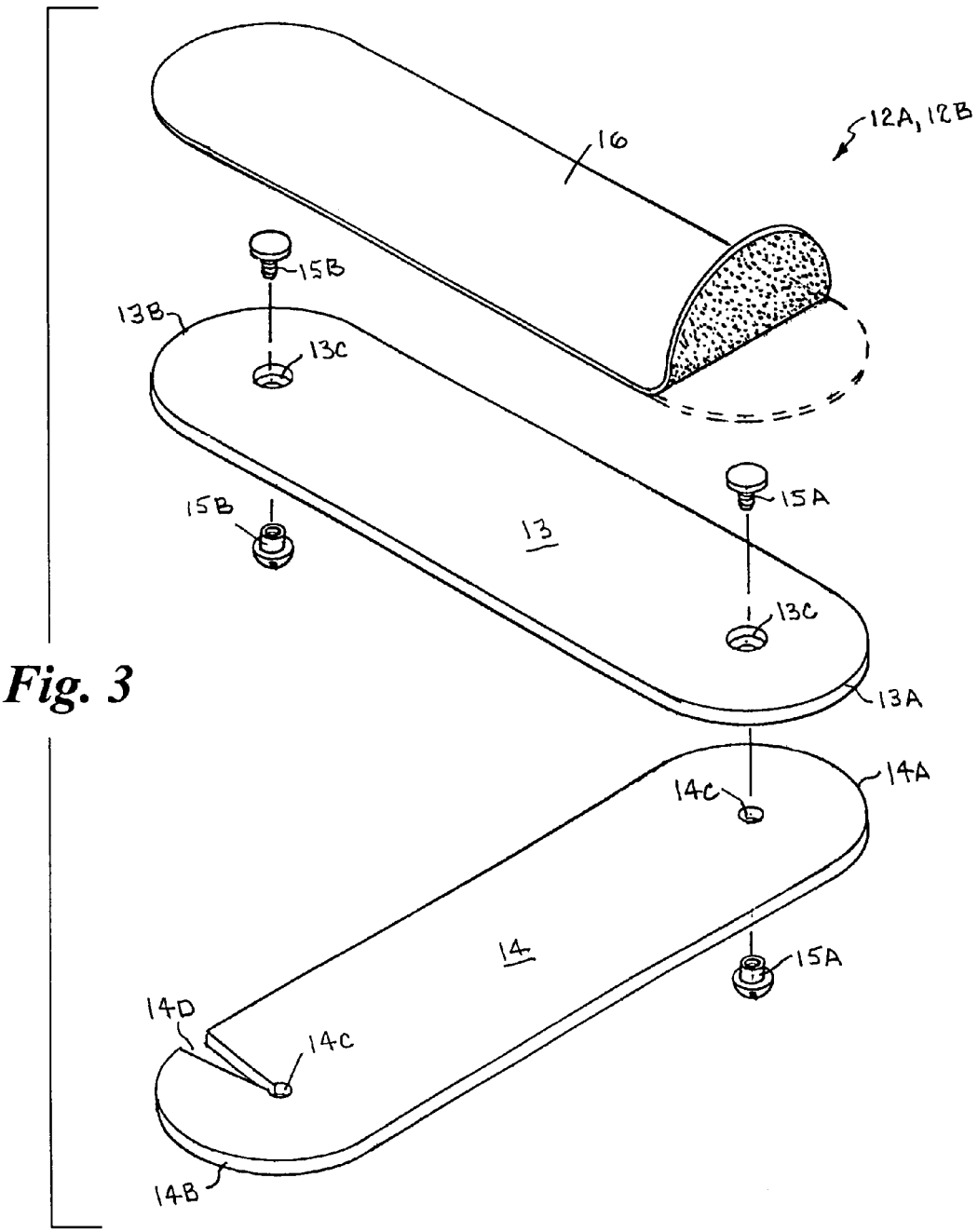
FIG. 3 is an exploded perspective view of one set of panels of the articulated parallelogram frame, shown in an unassembled condition.

Referring additionally to FIG. 3, each top panel 13 and bottom panel 14 is a thin rectangular panel having rounded first and second ends 13A, 13B and 14A, 14B, respectively. Each top panel 13 has a counterbored central bore 13C adjacent to its first and second ends extending therethrough in longitudinally spaced relation along the central longitudinal axis. Each bottom panel 14 has a central bore 14C adjacent to its first and second ends extending therethrough in longitudinally spaced relation along the central longitudinal axis so as to be axially aligned with the counterbored central bores 13C of the top panel 13. Each bottom panel 14 has a generally V-shaped slot 14D extending transversely inwardly from a lateral side thereof adjacent to its second end 14B terminating in communication with the central bore 14C at that end defining a generally keyhole-shaped aperture.

The first ends 13A and 14A of the top and bottom panels 13 and 14 are superposed and pivotally joined together adjacent to their first ends 13A, 14A, by a first short pivot pin connector 15A installed through the aligned counterbored central bore 13C and bore 14C adjacent to the first ends of the top and bottom panels. A second short pivot pin connector 15B is installed through the counterbored central bore 13C adjacent to the second end 13B of the top panel 13 and its bottom end is disposed a short distance beneath the bottom surface of the top panel.

Optionally, a thin pad, or an ornamental plate or sticker 16 may be attached to the outer facing flat surface of the top panel 13, such as for example, by an adhesive material, glue, or bonding agent so as to cover the counterbored central bores 13C and heads of the pivot pin connectors 15A and 15B.

As best seen in FIGS. 3, 4, 5, 6, and 7, a first pair 12A and a second pair 12B of the pivotally connected top and bottom panels 13 and 14 are pivotally and detachably connected together by aligning the second pivot pin connector 15B of a top panel with the generally V-shaped slot 14D of a bottom panel 14 and pressing them toward one another such that the second pivot pin connector 15B is releasably engaged in the central bore 14C of the bottom panel in a snap fit relation.

The first pivot pin connector 15A that pivotally joins the top and bottom panels 13 and 14 together adjacent to their first ends 13A and 14A, and the second pivot pin connector 15B adjacent to the second end 13B of the top panel 13 may be push-lock screw fasteners, also known as Chicago screws, Chicago screw posts, male & female screws, or snap posts. These types of fasteners comprise a female or post member having a tubular post with internal threads, and a male or screw member having an externally threaded shank that engages the post member, and both members have an enlarged head at one end. One head may have a transverse slot and the other may be flat, or both the screw and the post may have slotted heads. These types of fasteners are commonly used in binders, and for binding photo albums, swatch books, scripts, blueprints, drawings, etc.

It should be understood that the first pair 12A and second pair 12B of the pivotally connected top and bottom panels 13 and 14 may be disconnected from one another by pulling the second ends 13B, 14B, of a top and bottom panel apart such that the second pivot pin connector 15B is disengaged from the central bore 14C and V-shaped slot 14D of the bottom panel 14.

As shown in FIGS. 6, 7, and 8, in a detached condition for compact storage, second ends 13B and 14B of the first and second pair 12A, 12B of pivotally connected top and bottom panels 13 and 14 are pivoted toward one another about the first pivot pin connector 15A to assume an overlapped parallel superposed relation such that the second pivot pin connector 15B is received in the V-shaped slot 14D of the bottom panel 14 and the panels are pressed toward one another such that the second pivot pin connector 15B is releasably engaged in the central bore 14C of the bottom panel in a snap fit relation. Thus, each pair of rectangular panels 12A and 12B in the compact superposed configuration (FIG. 8) can be easily stored and transported in a computer bag, briefcase or the like.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. A portable articulated support device for supporting objects on the lap of a seated user, comprising:

an articulated quadrilateral frame having four straight sides connected at four corners with opposed sides disposed in parallel spaced relation, said sides formed of elongate thin rectangular panels formed of rigid material;

said rectangular panels comprising a first pair of said rectangular panels and a second pair of said rectangular panels, each pair formed of a top panel and a bottom panel, said top panel and said bottom panel superposed and pivotally joined together at first ends by a first pivot pin connector extending therethrough adjacent to said first end to provide relative angular movement therebetween, each said top panel having a second pivot pin connector adjacent to a second end thereof extending from a bottom surface thereof longitudinally spaced from, and axially aligned with said first pivot pin connector, and each said bottom panel having a generally V-shaped aperture extending transversely inwardly from a lateral side thereof adjacent a second end thereof terminating in communication with a central bore longitudinally spaced from, and axially aligned with, said second pivot pin connector to receive and releasably engage said second pivot pin connector in said central bore in a snap fit relation;

in an assembled condition, said frame being pivotally movable between an expanded generally rectangular shape and a collapsed generally diamond-shaped rhombus to be supported in a generally horizontal plane upon the lap of the seated user; and said rectangular panels forming flat support surfaces for receiving and supporting objects on the lap of the seated user; and in a detached condition, said top panel and said bottom panel of each of said first pair and said second pair of rectangular panels is pivoted about said first pivot pin connector to assume an overlapped parallel superposed relation for compact storage.

2. The portable articulated support device according to claim 1, wherein said quadrilateral frame is of a parallelogram configuration and said opposed straight sides are of equal length.

3. The portable articulated support device according to claim 1, wherein in said assembled condition, said second pivot pin connector of said top panel of said first pair of said rectangular panels is received in said V-shaped slot and releasably engaged in said central bore of said bottom panel of said second pair of rectangular panels such that said first pair of said rectangular panels and said second pair of rectangular panels are pivotally and detachably connected together; and in said detached condition for compact storage, said second pivot pin connector of said top panel of said first pair of said rectangular panels is laterally withdrawn from said central bore and V-shaped slot of said bottom panel of said first pair of said rectangular panels; and said top panel and said bottom panel of each said pair of rectangular panels are pivoted toward one another about said first pivot pin connector extending therethrough to assume an overlapped parallel superposed relation such that said second pivot pin connector of said top panel is received in said V-shaped slot and releasably engaged in said central bore of said bottom panel in a snap fit relation.

* * * * *